(12) United States Patent
Van Den Berg et al.

(10) Patent No.: US 8,012,436 B2
(45) Date of Patent: Sep. 6, 2011

(54) QUENCHING VESSEL

(75) Inventors: Robert Van Den Berg, Munich (DE); Wouter Koen Harteveld, Amsterdam (NL); Hans Joachim Heinen, Gummerbach (DE); Thomas Paul Von Kossak-Glowczewski, Gummersbach (DE)

(73) Assignee: Shell Oil Company, Houston, TX (US)

( * ) Notice: Subject to any disclaimer, the term of this patent is extended or adjusted under 35 U.S.C. 154(b) by 278 days.

(21) Appl. No.: 12/204,581

(22) Filed: Sep. 4, 2008

(65) Prior Publication Data
US 2009/0133328 A1 May 28, 2009

Related U.S. Application Data

(60) Provisional application No. 60/970,168, filed on Sep. 5, 2007.

(30) Foreign Application Priority Data

Sep. 4, 2007 (EP) .................................... 07115657

(51) Int. Cl.
| | |
|---|---|
| *B01J 10/00* | (2006.01) |
| *B01J 8/04* | (2006.01) |
| *B01J 8/00* | (2006.01) |
| *B01J 19/00* | (2006.01) |
| *C01B 3/36* | (2006.01) |
| *C10J 3/46* | (2006.01) |
| *C10J 3/54* | (2006.01) |

(52) U.S. Cl. ........ 422/647; 422/129; 422/198; 422/600; 422/604; 422/630; 422/644; 48/197 R

(58) Field of Classification Search .......... 48/87, 197 R; 422/194, 129, 198, 600, 604, 630, 644, 647
See application file for complete search history.

(56) References Cited

U.S. PATENT DOCUMENTS

| | | | |
|---|---|---|---|
| 2,480,019 A | 8/1949 | Grimmeisen | ................... 158/77 |
| 2,797,963 A | 9/1954 | Wilson | ......................... 299/28.5 |
| 2,970,772 A | 4/1960 | Boosinger et al. | ............ 239/105 |
| 2,998,464 A * | 8/1961 | Burleson et al | .............. 585/540 |
| 3,541,788 A | 11/1970 | Schutz | ......................... 60/39.09 |
| 3,988,421 A | 10/1976 | Rinaldi | ......................... 423/210 |
| 4,054,424 A * | 10/1977 | Staudinger et al. | ............ 48/210 |
| 4,083,932 A | 4/1978 | Muraco et al. | ................ 423/210 |
| 4,848,982 A * | 7/1989 | Tolle et al. | ......................... 48/69 |
| 4,859,213 A * | 8/1989 | Segerstrom | ........................ 48/87 |
| 4,890,793 A | 1/1990 | Füglistaller | ................... 239/427 |

(Continued)

FOREIGN PATENT DOCUMENTS

DE 3809313 10/1989

(Continued)

*Primary Examiner* — Walter Griffin
*Assistant Examiner* — Natasha Young

(57) ABSTRACT

A quenching vessel being, in use, vertically elongated and provided with an inlet for gas at its upper end, an outlet for cooled gas at its lower end defining a pathway for a gas flow directed downwardly, the vessel being provided at its upper end with a first internal tubular wall part which wall part has an opening fluidly connected to the inlet for gas and wherein the tubular wall part is connected at its lower end with a divergent conical part having walls which are inclined outwardly in the direction of the pathway for gas, wherein an arrangement of more than one nozzle for atomisation and spraying a liquid quench medium in a downward direction into the pathway for the gas flow are present in the space enclosed by the divergent conical part.

19 Claims, 3 Drawing Sheets

U.S. PATENT DOCUMENTS

| | | | |
|---|---|---|---|
| 4,897,090 A * | 1/1990 | Liu et al. | 48/210 |
| 4,973,337 A | 11/1990 | Jokisch et al. | 48/87 |
| 5,124,134 A * | 6/1992 | Come | 422/643 |
| 5,329,760 A | 7/1994 | Bradley et al. | 60/39.06 |
| 5,433,760 A * | 7/1995 | Doering et al. | 48/197 R |
| 5,648,048 A | 7/1997 | Kuroda et al. | 422/168 |
| 5,732,885 A | 3/1998 | Huffman | 239/416.5 |
| 5,976,203 A | 11/1999 | Deeke et al. | 48/62 R |
| 6,006,999 A | 12/1999 | Tiessen et al. | 239/3 |
| 6,062,547 A * | 5/2000 | Nilsson | 261/108 |
| 6,149,137 A * | 11/2000 | Johnson et al. | 261/27 |
| 6,800,781 B2 * | 10/2004 | Herold et al. | 560/347 |
| 2004/0222317 A1 | 11/2004 | Huffman | 239/398 |
| 2006/0260191 A1 | 11/2006 | Van Den Berg et al. | 48/197 R |

FOREIGN PATENT DOCUMENTS

| | | |
|---|---|---|
| DE | 19714071 | 10/1998 |
| DE | 10004138 | 8/2001 |
| DE | 102005004341 | 8/2006 |
| EP | 0318071 | 10/1988 |
| EP | 0379022 | 1/1990 |
| EP | 0400740 | 5/1990 |
| JP | 53110967 | 9/1978 |
| JP | 62280578 | 5/1987 |
| WO | WO0037170 | 6/2000 |
| WO | WO00/71231 | 11/2000 |
| WO | WO2004005438 | 1/2004 |
| WO | WO2006117355 | 11/2006 |

* cited by examiner

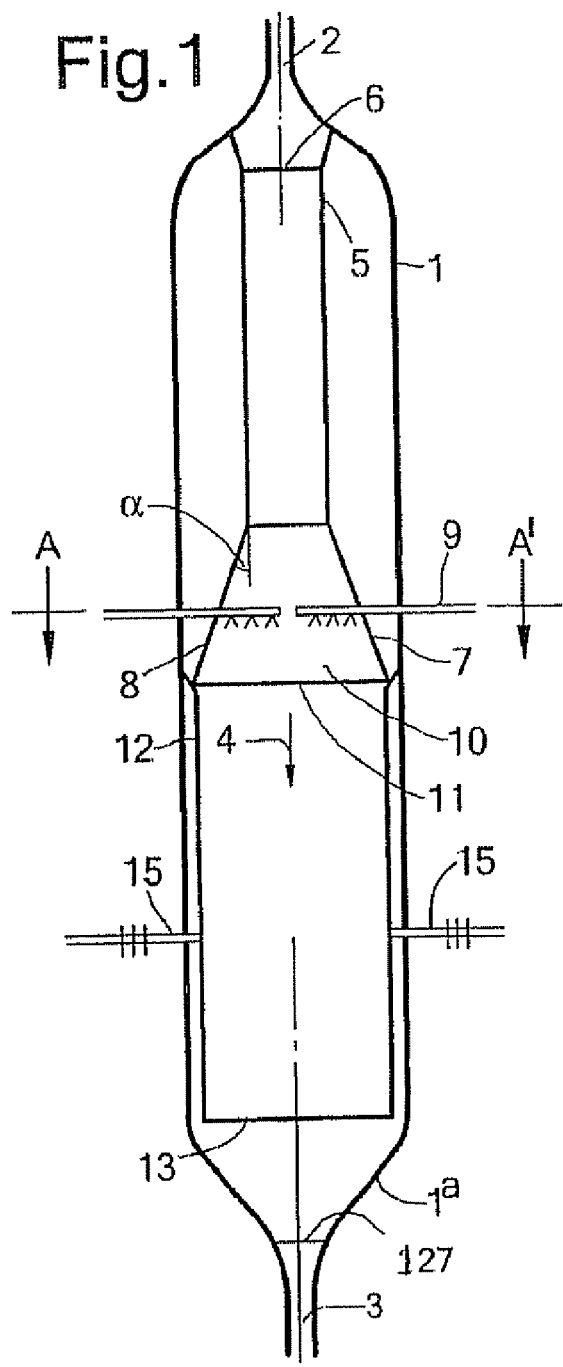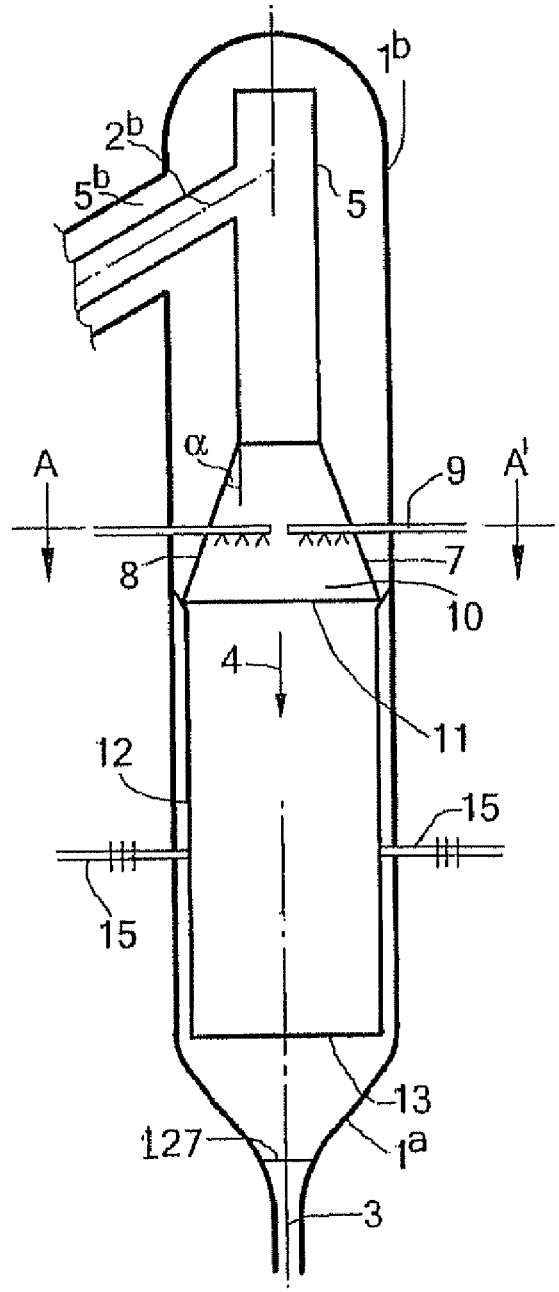

US 8,012,436 B2

QUENCHING VESSEL

This application claims the benefit of European Application no. 07115657.4 filed on 4 Sep. 2007 and U.S. Provisional Application 60/970,168 filed on 5 Sep. 2007.

TECHNICAL FIELD OF THE INVENTION

The invention is directed to a quenching vessel being vertically elongated and being provided with an inlet for hot gas at its upper end and an outlet for cooled gas at its lower end. Between said inlet and outlet a pathway for a gas flow directed downwardly is thus present. The vessel is furthermore provided with one or more injector(s) for injecting a quench medium into the pathway for the gas flow.

BACKGROUND OF THE INVENTION

Such a vessel is known from US-A-2006/0260191. In FIG. 4 of this publication a gasification reactor is shown for gasification of a solid carbonaceous feedstock to obtain a synthesis gas mixture having a temperature of between 1200 and 1800° C. The reactor has an outlet for hot synthesis gas at its upper end and an outlet for slag at its lower end. The reactor itself is provided with a quenching means to lower the temperature in a first step to a temperature below the solidification point of the non-gaseous components as present in the synthesis gas. The synthesis gas is further reduced in temperature by injecting a mist of water into the flow of synthesis gas in a separate quenching vessel connected to the gasification reactor by means of a duct. An advantage of the quenching vessel is that the design of such a vessel can be much simpler than a waste heat boiler having multiple heat exchanger banks. A further advantage is that a synthesis gas may be obtained which contains water at a level lower than the saturation content. This makes it possible to obtain a substantially cooled synthesis gas from which ash can be separated using a filter as for example described in EP-B-1178858 or by using a cyclone.

JP-A-53110967 describes a quenching vessel wherein a quenching medium is injected into a downwardly flowing gas under an angle.

Applicants have found however that the design of the vessel as shown in FIG. 4 of US-A-2006/0260191 or the design of JP-A-53110967 has certain disadvantages. A major concern regarding these designs is that ash, as one of the non-gaseous components as present in the synthesis gas, can form deposits on the vessel walls at downstream points relative to the position where water is injected.

SUMMARY OF THE INVENTION

The present invention aims at providing a quenching vessel, which is more robust and capable of effectively cooling synthesis gas having a content of non-gaseous components, such as ash.

The quenching vessel as described overcomes the disadvantages of the prior art quenching vessel. The invention is directed to a quenching vessel being, in use, vertically elongated and provided with an inlet for gas at its upper end, an outlet for cooled gas at its lower end defining a pathway for a gas flow directed downwardly, the vessel being provided at its upper end with a first internal tubular wall part which wall part has an opening fluidly connected to the inlet for gas and wherein tubular wall part is connected at its lower end with a divergent conical part having walls which are inclined outwardly in the direction of the pathway for gas, wherein an arrangement of more than one nozzle for atomisation and spraying a liquid quench medium in a downward direction into the pathway for the gas flow are present in the space enclosed by the divergent conical part.

Applicants found that by having one or more downward directed injector(s) present in the space enclosed by the divergent conical part less or no deposition of a mixture of ash and water will occur. This is very important to achieve a continuous operation for a prolonged period of time. Applicants found that because of the one or more downward directed injector(s) and the conical part the liquid quenching medium will be able to fully evaporate before contacting the inner wall of the quenching vessel itself. This is advantageous because applicants know from past experience that the combination of ash and liquid quenching medium, especially liquid water, may cause serious fouling if it contacts the internal surfaces of a quenching vessel.

BRIEF DESCRIPTION OF THE DRAWINGS

FIG. 1 shows a cross-sectional view of the quench vessel.
FIG. 1b shows a cross-sectional view of another embodiment of the quench vessel.

DETAILED DESCRIPTION

Figure 2:
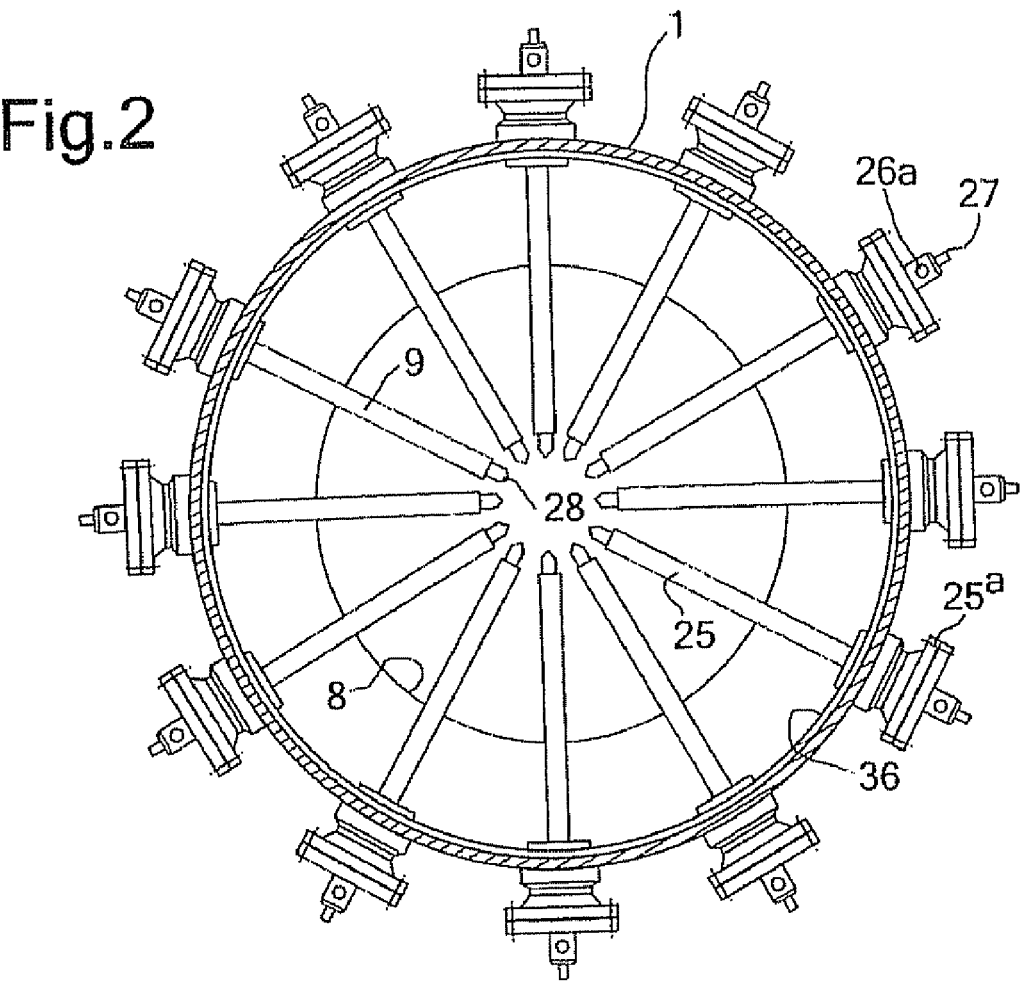
FIG. 2 shows a cross-sectional view AA' of the quench vessel of FIG. 1 or FIG. 1b.

The quenching vessel is defined using terms as upper, lower, downwardly and vertically. These terms relate to the orientation of the quench vessel when in use. These terms do not intend to limit the scope of the invention to a vertically oriented vessel.

The quenching vessel according to the invention is provided with an inlet for gas at its upper end. This inlet can be positioned at the top end of the vessel or alternatively at the side of the vessel to connect to a connecting duct between said quenching vessel and gasification reactor as illustrated in the earlier referred to FIG. 4 of US-A-2006/0260191. The quenching vessel is further provided at its upper end with a first internal tubular wall part. This part has an opening fluidly connected to the inlet for gas. The tubular wall part is connected at its lower end with a divergent conical part having walls, which are inclined outwardly in the direction of the pathway for gas. The first inner wall part and/or the wall of the divergent conical part preferably has a membrane wall design. More preferably both these wall parts have a water-cooled membrane wall design. The term membrane wall design is commonly known and refers to a cooled wall arrangement. Such a wall is gas tight and comprises an arrangement of interconnected conduits. Cooling is typically accomplished by evaporating cooling water. These conduits are fluidly connected via a common distributor to a supply for cooling medium and at their other ends fluidly connected to a common header to discharge used cooling medium.

The divergent conical part has walls, which are inclined outwardly in the direction of the pathway for gas. Preferably the angle (α in FIG. 1) between the surface of this wall and the vertical axis of the quenching vessel is between 3° to 30° and more preferably between 5° and 10°.

The divergent conical part is suitably followed at its lower end by a second tubular inner wall. This second tubular wall has a lower open end, which is in fluid communication with the outlet for cooled gas. This means that both parts may optionally be fixed to each other to form a gas tight connection. The second tubular wall may optionally be designed as a membrane wall. Because the temperature conditions at that part of the quenching vessel are more moderate, a more simple design, suitably made from a high alloy steel plate, for this part is preferred. The upper cylindrical part, the conical part and the second tubular inner wall can be provided with one or more cleaning devices, which can be mechanical rappers, pneumatic blasters devices or acoustic cleaning devices. The second tubular inner wall is open ended at its lower end. This open end will suitably be present at the lower end of the vessel and preferably just above a tapered end of said vessel. This preferred tapered end terminates in a central opening, which is the outlet for cooled gas.

The internal vessel dimensions which define the pathway for gas flow are so chosen to achieve a certain minimal downward gas velocity of synthesis gas for a given design throughput. Preferably the gas velocity is at least 1 m/s when the gas passes the first internal tubular wall part.

The length of the second tubular inner wall in the direction of the flow path for gas should be long enough to achieve the desired cooling after the quenching medium has been added in the upstream part. Preferably the ratio between the internal diameter of the second tubular inner wall and its length is between 1:1 and 1:6.

The quenching vessel is provided with one or more injector(s) for injecting a quench medium into the pathway for the gas flow. These one or more injector(s) are present in the space enclosed by the divergent conical part. It is believed, without wishing to be bound to the following theory, that by providing these one or more injector(s) at this location, the risk that ashes deposit on the wall is severely reduced. Preferably the means for injecting a quench medium comprise an arrangement of more than one nozzle for atomisation and spraying liquid in a downwardly direction. With a downwardly direction is especially meant that the direction of the liquid as it is discharged from the nozzles is vertically downward. It is of course understood that the flow of quench medium as it is discharged from the nozzle will have a cone form and that the average direction of this cone will be the direction of the liquid as it is sprayed from the nozzle. The nozzle can be a hydraulic nozzle. Hydraulic nozzles require a high injection pressure of typically at least 40 bar above the pressure of the synthesis gas. This is because when the pressure difference between the injection pressure and the pressure of the raw synthesis gas is lower, the droplets of in the injected mist may become too large. The latter may be at least partially offset by using a so-called twin fluid nozzle wherein an atomisation gas, which may be for example $N_2$, $CO_2$, steam or synthesis gas atomises the fluid into fine droplets. A preferred atomisation gas is synthesis gas recycled from a downstream process step. Using atomisation gas has the advantage that the difference between injection pressure and the pressure of the raw synthesis gas may be reduced while achieving the same droplet size and velocity. Such twin-fluid nozzles are well known and can for example be obtained from Spraying Systems Co. Examples of suitable nozzles are described in U.S. Pat. No. 5,732,885 and US-A-2004/0222317.

A preferred nozzle for use in the quenching vessel of the present invention is a nozzle comprising a vertical and central supply passage for a liquid quenching medium, as present in a passage body having outward and radial discharge openings at its lower end for quenching medium, said radial discharge openings being in fluid communication with an annular passage for downwardly flowing atomisation gas, which annular passage is defined by the passage body and an outer nozzle body, wherein said annular passage is fluidly connected to a single outlet passage at the lower end of the central passage, said outlet passage being defined by the inner wall of the nozzle body and wherein said outlet passage terminates at its lower end in an outlet opening for a mixture of quenching medium and atomisation gas.

More preferably the lower end of the outlet passage of the above nozzle has a diverging, in the downwardly direction, inner wall such that in use a cone-shaped spray of liquid quenching medium and atomisation gas is discharged in the flow path of the gas. The angle of the cone is preferably between 10 and 70° and more preferably between 15 and 25° (angle β in FIG. 4). An example of such a nozzle is shown in FIG. 2 of earlier referred to US-A-2004/0222317.

The arrangement of more than one nozzle for atomisation and spraying liquid in a downwardly direction may have any design which enables contacting of the synthesis gas flow and the liquid medium. Applicants have found a preferred design wherein the arrangement comprises a number of radial disposed arms extending from the wall of the quenching vessel and through openings in the wall of the divergent conical part to a central position. The arms are provided with one or more downwardly directed nozzles. Preferably the minimum horizontal distance between the centre of the outlet opening of the nozzles and the wall of the divergent conical part is between 0.2 and 1 m (distance d in FIG. 3).

Preferably from 4 to 15 arms are present. Each arm may suitably have from 3 to and including 10 nozzles. Preferably the nozzle closest to the central position has a slightly tilted main outflow direction between downwardly and to the central position. The arms are preferably present in one horizontal plane. Alternatively the arms may be present in different planes, for example in a staggered configuration.

Because the synthesis gas contains a substantial amount of non-gaseous components it may be advantageous under these conditions to provide means for supplying a shielding gas around the nozzles. For the same reason the arms are provided with means to avoid or remove deposits to accumulate on top of the arms. Such means can be mechanical rapper means directly on the arms or on metal shields placed above said arm. Such means can also be acoustic cleaning means. Such means can also be blaster to continuously or intermittently blast away any solid deposits or remove any solid deposits. The shielding and/or blasting gas may be for example $N_2$, $CO_2$, steam or synthesis gas and is more preferably of the same source as the atomisation gas.

The quenching vessel is suitably used to cool a gas having non-gaseous components, such as ash, from an elevated temperature to a lower temperature by injecting a suitable quenching medium as a mist into the flow of gas via the one or more injector(s). Preferably the gas is synthesis gas, i.e. a mixture comprising mostly hydrogen and carbon monoxide, as obtained when gasifying an ash containing carbonaceous feedstock. Examples of such feedstocks are coal, coke from coal, coal liquefaction residues, petroleum coke, soot, biomass, and particulate solids derived from oil shale, tar sands and pitch. The coal may be of any type, including lignite, sub-bituminous, bituminous and anthracite. The gasification of such feedstock to obtain the feedstock for the quenching vessel is not critical. Preferably a gasification reactor configuration is used wherein the hot synthesis gas is discharged and cooled separately from the slag. Thus excluded are gasification reactors having a water bath at the lower end through which hot synthesis gas is passed and wherein slag and synthesis gas are reduced in temperature simultaneously.

The synthesis gas entering the quench vessel may have a temperature between 500 and 900° C., more suitably between 600 and 900° C. The pressure is suitably between 1 and 10 MPa. The temperature of the gas after the quenching step is preferably between 200 and 600° C. and more preferably between 300 and 500° C. and even more preferably between 350 and 450° C.

The quenching medium may be any liquid having a suitable viscosity in order to be atomized. Non-limiting examples of the liquid to be injected are a hydrocarbon liquid, a waste stream as obtained in a downstream process, which uses the synthesis gas as feedstock. Preferably the liquid comprises at least 50 wt % water. Most preferably the liquid comprises substantially water (i.e. >95 vol %). In a preferred embodiment the wastewater, also referred to as black water, as may be obtained in a downstream synthesis gas scrubber is used as the liquid. According to an especially preferred embodiment, wherein the quenching medium comprises water the amount of injected water is selected such that the raw synthesis gas leaving the quenching sections comprises at least 40 vol. % $H_2O$, preferably from 40 to 60 vol. % $H_2O$, more preferably from 40 to 55 vol. % $H_2O$.

Preferably the injected quenching medium has a temperature of at most 50° C. below the bubble point at the prevailing pressure conditions at the point of injection, particularly at most 15° C., even more preferably at most 10° C. below the bubble point. To this end, if the injected quenching medium is water, it usually has a temperature of above 90° C., preferably above 150° C., more preferably from 200° C. to 270° C., for example 230° C. The temperature will obviously depend on the operating pressure of the gasification reactor, i.e. the pressure of the raw synthesis gas as specified further below. Hereby a rapid vaporization of the injected quenching medium is obtained, while cold spots are avoided.

Further it is preferred that the quenching medium is injected in the form of a mist of fine liquid droplets. More preferably the mist comprises droplets having a diameter of from 50 to 200 μm, even more preferably from 50 to 150 μm. Preferably, at least 60 vol. % of the injected liquid is in the form of droplets having the indicated sizes.

To enhance quenching of the raw synthesis gas, the quenching medium is preferably injected with a mean velocity of between 10 and 60 m/s and more preferably between 20 and 50 m/s.

When the nozzle is a twin fluid nozzle it is preferred that the quenching medium is injected with an injection pressure of at least 5 bar above the pressure of the raw synthesis gas, preferably from at least 10 bar above the pressure of the raw synthesis gas and up to 20 bar above the pressure of the raw synthesis gas.

A significant part of the solids as present in the mixture of hydrogen and carbon monoxide as obtained in the quenching vessel are preferably separated by means of a cyclone. The remaining solids are removed in a subsequent scrubbing step. Preferably the scrubbing step comprises a venturi scrubber followed by a packed bed wash column. The resultant gas will have a high water content of between 50 and 60 vol % which makes this gas suitable to perform a downstream shift reaction. In this catalytic shift reaction carbon monoxide reacts with water to carbon dioxide and hydrogen. Because water is already present in the feed to the shift, less or even no additional water at all has to be added in the shift section. A shift reaction is advantageous when pure hydrogen or a higher hydrogen to carbon monoxide ratio is required. Examples of such applications are so-called IGCC processes with carbon dioxide capture, hydrogen manufacturing and processes wherein the mixture is used as feed, for example as feed to Fischer-Tropsch synthesis, an acetic acid synthesis, a methanol synthesis and a di-methyl-ether synthesis or as a reducing gas such as in direct ore reduction processes.

The gas as obtained in the scrubbing step is preferably further purified to separate $CO_2$, $H_2S$, COS and/or HCN and other components. Examples of processes suited for such purification are the commercial gas treating processes Sulfinol-D, Sulfinol-M, DIPA-X, Genosorb, Selexol and Rectisol.

The invention is also directed to the following process. Process for quenching a synthesis gas having a temperature of between 500 and 900° C. and a pressure of between 1 and 10 MPa to a temperature of between 200 and 600° C. in a vertical vessel wherein said gas passes the vessel in a downward direction and wherein the vessel has a divergent conical part having walls which are inclined outwardly in the direction of the gas and wherein to the gas as it passes the divergent conical part a mist of liquid water droplets is injected in a downward direction, wherein the amount of injected water is selected such that the synthesis gas leaving the vessel comprises from 40 to 60 vol. % water. Applicants have found that by injecting the mist of water at the divergent conical part in the same direction as the synthesis gas the chances that a droplet of liquid water will contact the inner wall of the vessel is minimized. This is advantageous because applicants know from past experience that liquid water and ash as present in the synthesis gas will cause serious fouling if it contacts the internal surfaces of the process equipment.

Further preferred embodiments are described above. Preferably this process is performed in a quenching vessel according to the present invention.

FIG. 1 shows a vertical positioned quenching vessel 1. Vessel 1 has an inlet 2 for gas at its upper end, an outlet 3 for cooled gas at its lower end defining a pathway 4 for a gas flow directed downwardly. Vessel 1 is also provided with one or more injector(s) 9 for injecting a quench medium into the pathway 4 for the gas flow. FIG. 1 shows a first internal tubular wall part 5 which wall part 5 has an opening 6 fluidly connected to the inlet 2 for gas. Tubular wall part 5 is connected at its lower end with a divergent conical part 7 having walls 8 which are inclined outwardly in the direction of the pathway 4 for gas. As shown, the one or more injector(s) 9 for injecting a quench medium into the pathway 4 for the gas flow are present in the space 10 enclosed by the divergent conical part 7.

Divergent conical part 7 is followed at its lower end 11 by a second tubular inner wall 12. The lower open end 13 of the second tubular inner wall 12 is in fluid communication with the outlet 3 for cooled gas.

FIG. 1 also shows angle α, which is about 7.5° in the illustrated embodiment. The second tubular inner wall 12 is provided with one or more rappers 15. Optionally the first tubular inner wall part 5 and the diverging conical part 7 can also be provided with one or more rappers. The lower end of vessel 1 suitably has a tapered end 1a terminating in a central opening 127 as the outlet 3 for cooled gas.

Figure 4:
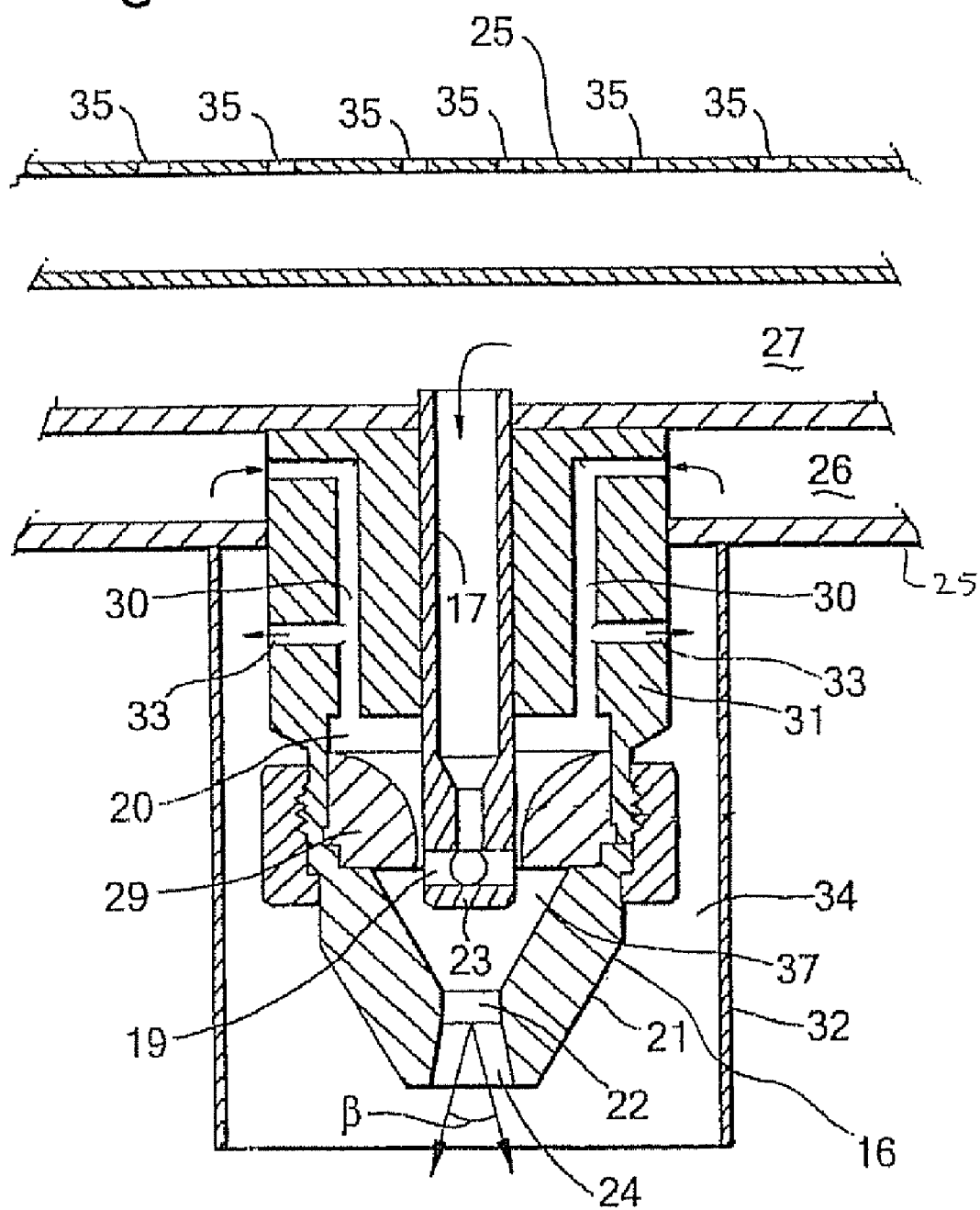
FIG. 4 shows a detail of the nozzle as schematically shown in FIG. 3.

FIG. 1b shows a similar vertical positioned quenching vessel 1b as shown in FIG. 1. Vessel 1b is different from vessel 1 in that the inlet 2b for gas is provided at side wall of the upper end of vessel 1b. Such a configuration is preferred when use is made of a connecting duct 5b as shown in FIG. 4 of US-A-2006/0260191. The upper end of the vessel 1b is referred to as the gas reversal chamber.

FIG. 2 shows 12 radially disposed arms 25 provided with downwardly directed nozzles as seen from above. The arms are fixed to the wall of vessel 1 and intersect with wall 8 of the divergent conical part 7 and extend to a central position. The arms 25 are connected to the vessel via a flange 25a and can therefore be easily removed for repairs or maintenance.

Figure 3:
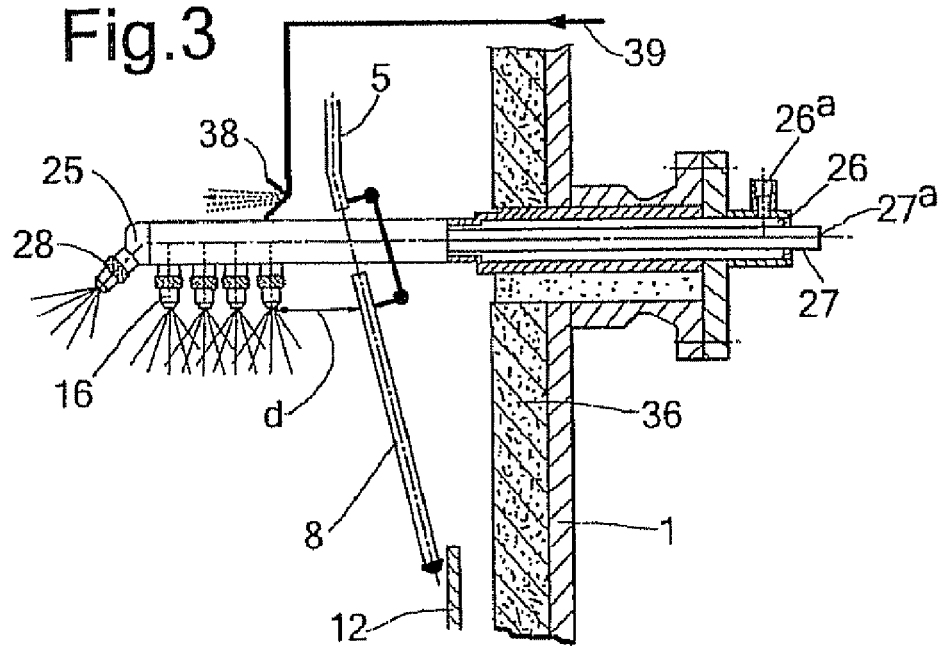
FIG. 3 shows a detail of an injector for injecting a quenching medium as part of the quench vessel.

FIG. 3 shows such an arm 25 in more detail. One arm 25 is provided with a supply channel 26 for atomisation gas and a supply channel 27 for quenching medium. Four downwardly directed nozzles 16 are provided and one slightly tilted nozzle 28 is provided on the illustrated arm 25. The axis of the downwardly directed nozzles 16 are vertically oriented. The direction of the resulting spray of liquid as discharged from nozzles 16 is thus vertically downward. The arm is fixed in an opening in the wall of vessel 1. The wall of vessel 1 is protected against the high temperatures by means of membrane wall 8 of the divergent conical part 7 and refractory 36, which is present as a layer against the inner side of said wall. Also shown is the upper end of the second inner wall 12 and the lower end of tubular wall part 5. The supply channel 26 is connected to an inlet 26a for atomisation gas. The supply channel 27 is connected to an inlet 27a for liquid.

FIG. 3 also shows a blaster 38 as present on the upper side of arm 25. Blaster 38 is present to continuously or intermittently blast away any deposits, which may form on the upper side of arm 25. The direction of the blaster is in line with the horizontal direction of arm 25. Blaster 38 are provided with a supply conduit 39 for blasting gas.

FIG. 4 shows a detail of arm 25 and one nozzle 16. Nozzle 16 has a vertical and central supply passage as present in supply passage body 17 for the liquid quenching medium as supplied via supply channel 27. The passage body 17 has outward and radial discharge openings 19 at its lower end for quenching medium exiting in a mixing chamber 37. The radial discharge openings 19 are in fluid communication with an annular passage 20 for downwardly flowing atomisation gas. The annular passage 20 is in fluid communication with atomisation gas supply channel 26 via a passage 30 in base body 31. The annular passage 20 is defined by the supply passage body 17 and an outer nozzle body 21 and an insert 29. The annular passage 20 is fluidly connected to a single outlet passage 22 at the lower end 23 of the nozzle 16. Outlet passage 22 being defined by the inner wall of the nozzle body 21. The outlet passage 22 terminates at its lower end in a diverging outlet opening 24 for a mixture of quenching medium and atomisation gas.

FIG. 4 also shows a preferred shield 32 fixed at its upper end to arm 25 and open at its lower end. Shield 32 may have any form, for example rectangular. Suitably the form of shield 32 is tubular. In an alternative embodiment one shield can surround more than one nozzle. Nozzle 16 is provided with atomisation outlet openings 33 which are in fluid communication with the supply channel 26 for atomisation gas. Through these openings 33 part of the atomisation gas exits into a space between the nozzle 16 and its surrounding shield 32. In this manner it is avoided that ash can accumulate in said space 34. Also shown are openings 35 at the upper end of arm 25. Through these openings 35 another part of the atomisation gas can be discharged in

The invention claimed is:

1. A quenching vessel being, in use, vertically elongated and provided with an inlet for gas at its upper end, an outlet for cooled gas at its lower end defining a pathway for a gas flow directed downwardly, the vessel being provided at its upper end with a first internal tubular wall part which wall part has an opening fluidly connected to the inlet for gas and wherein the tubular wall part is connected at its lower end with a divergent conical part having walls which are inclined outwardly in the direction of the pathway for gas, wherein an arrangement of more than one nozzle for atomisation, spraying and injecting a liquid quench medium in a downward direction into the pathway for the gas flow is present in the space enclosed by the divergent conical part and comprises a number of radially disposed arms extending from the wall of the quenching vessel and through openings in the wall of the divergent conical part to a central position and wherein the arms are provided with one or more downwardly directed nozzles.

2. A vessel according to claim 1, wherein the first internal tubular wall part and/or the wall of the divergent conical part has a water cooled membrane wall design.

3. A vessel according to claim 1, wherein the angle between the surface of the wall of the divergent conical part and the vertical axis is between 3° and 30°.

4. A vessel according to claim 1, wherein the divergent conical part is followed at its lower end by a second tubular inner wall having a lower open end, which lower end is in fluid communication with the outlet for cooled gas.

5. A vessel according to claim 4, wherein the second tubular inner wall is provided with one or more cleaning devices.

6. A vessel according to claim 1, wherein the minimum horizontal distance between the centre of the outlet opening of the nozzles and the wall of the divergent conical part is between 0.2 and 1 m.

7. A vessel according to claim 1, wherein the nozzle comprises a vertical and central supply passage for a liquid quenching medium, as present in a passage body, said passage body having outward and radial discharge openings at its lower end, said radial discharge openings being in fluid communication with an annular passage for atomisation gas, wherein said annular passage is fluidly connected to a single outlet passage at the lower end of the central passage body, said outlet passage being defined by the inner wall of a nozzle body and wherein said outlet passage terminates at its lower end in a diverging outlet opening for a mixture of quenching medium and atomisation gas.

8. A vessel according to claim 7, wherein the lower end of the outlet passage has a diverging, in the downwardly direction, inner wall such that in use a cone-shaped spray of liquid quenching medium and atomisation gas is discharged in the flow path of the gas.

9. A quenching vessel being, in use, vertically elongated and provided with an inlet for gas at its upper end, an outlet for cooled gas at its lower end defining a pathway for a gas flow directed downwardly, the vessel being provided at its upper end with a first internal tubular wall part which wall part has an opening fluidly connected to the inlet for gas and wherein the tubular wall part is connected at its lower end with a divergent conical part having walls which are inclined outwardly in the direction of the pathway for gas, wherein an arrangement of more than one nozzle for atomisation and spraying a liquid quench medium in a downward direction into the pathway for the gas flow is present in the space enclosed by the divergent conical part, wherein the lower end of the vessel has a tapered end terminating in a central opening as the outlet for cooled gas.

10. A process for quenching a synthesis gas having a temperature of between 500 and 900° C. and a pressure of between 1 and 10 MPa to a temperature of between 200 and 600° C. in a vertical vessel, which vessel is vertically elongated and provided with an inlet for gas at its upper end, an outlet for cooled gas at its lower end defining a pathway for a gas flow directed downwardly, the vessel being provided at its upper end with a first internal tubular wall part which wall part has an opening fluidly connected to the inlet for gas and wherein the tubular wall part is connected at its lower end with a divergent conical part having walls which are inclined outwardly in the direction of the pathway for gas, wherein an arrangement of more than one nozzle for atomisation and spraying a liquid quench medium in a downward direction into the pathway for the gas flow is present in the space enclosed by the divergent conical part, wherein said gas passes through the vessel in a downward direction and wherein the vessel has a divergent conical part having walls which are inclined outwardly in the direction of the gas and wherein to the gas as it passes the divergent conical part a mist of liquid water droplets is injected in a downward direction, wherein the amount of injected water is selected such that the synthesis gas leaving the vessel comprises from 40 to 60 vol. % water.

11. A process according to claim 10, wherein the first internal tubular wall part and/or the wall of the divergent conical part comprises a water cooled membrane wall.

12. A process according to claim 10, wherein the angle between the surface of the wall of the divergent conical part and the vertical axis is between 3° and 30°.

13. A process according to claim 10, wherein the divergent conical part is followed at its lower end by a second tubular inner wall having a lower open end, which lower end is in fluid communication with the outlet for cooled gas.

14. A process according to claim 10, wherein the second tubular inner wall is provided with one or more cleaning devices.

15. A process according to claim 10, wherein the minimum horizontal distance between the centre of the outlet opening of the nozzles and the wall of the divergent conical part is between 0.2 and 1 m.

16. A process according to claim 10, wherein the nozzle comprises a vertical and central supply passage for a liquid quenching medium, as present in a passage body, said passage body having outward and radial discharge openings at its lower end, said radial discharge openings being in fluid communication with an annular passage for atomisation gas, wherein said annular passage is fluidly connected to a single outlet passage at the lower end of the central passage body, said outlet passage being defined by the inner wall of a nozzle body and wherein said outlet passage terminates at its lower end in a diverging outlet opening for a mixture of quenching medium and atomisation gas.

17. A process according to claim 10, wherein the lower end of the outlet passage has a diverging, in the downwardly direction, inner wall such that in use a coneshaped spray of liquid quenching medium and atomisation gas is discharged in the flow path of the gas.

18. A process according to claim 10, wherein the arrangement of more than one nozzle for atomisation and spraying liquid in a downward direction for injecting a quench medium comprises a number of radially disposed arms extending from the wall of the quenching vessel and through openings in the wall of the divergent conical part to a central position and wherein the arms are provided with one or more downwardly directed nozzles.

19. A process according to claim 10, wherein the lower end of the vessel has a tapered end terminating in a central opening as the outlet for cooled gas.

* * * * *